US009446706B2

(12) United States Patent
Singleton et al.

(10) Patent No.: US 9,446,706 B2
(45) Date of Patent: Sep. 20, 2016

(54) HEADLIGHT DAMPENING SYSTEM AND METHOD

(71) Applicant: Valeo Lighting Systems North America, LLC, Seymour, IN (US)

(72) Inventors: Mark Andrew Singleton, Seymour, IN (US); Joseph M. Scheller, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 173 days.

(21) Appl. No.: 14/225,052

(22) Filed: Mar. 25, 2014

(65) Prior Publication Data

US 2015/0274065 A1 Oct. 1, 2015

(51) Int. Cl.
*F21V 15/04* (2006.01)
*B60Q 1/04* (2006.01)
*B60Q 1/076* (2006.01)

(52) U.S. Cl.
CPC ........... *B60Q 1/0491* (2013.01); *B60Q 1/0483* (2013.01); *B60Q 1/076* (2013.01); *F21V 15/04* (2013.01)

(58) Field of Classification Search
CPC . B60Q 1/0491; B60Q 1/0483; F21S 48/211; F21S 48/212; F21V 15/04; B60R 19/02; B60R 2019/505
See application file for complete search history.

(56) References Cited

U.S. PATENT DOCUMENTS

| 4,475,148 | A | * | 10/1984 | Tomforde | ............ | B60Q 1/0491 362/269 |
|---|---|---|---|---|---|---|
| 6,871,989 | B2 | | 3/2005 | Nakazawa et al. | | |
| 8,197,108 | B2 | * | 6/2012 | Eckert | ................ | B60Q 1/0416 293/117 |
| 2003/0117810 | A1 | | 6/2003 | Nakazawa et al. | | |
| 2004/0057249 | A1 | * | 3/2004 | Arlon | ................... | B60Q 1/0491 362/546 |
| 2015/0274065 | A1 | * | 10/2015 | Singleton | ............. | B60Q 1/0483 362/546 |

FOREIGN PATENT DOCUMENTS

| DE | 10217191 | | 10/2003 | | |
|---|---|---|---|---|---|
| DE | 102007053727 | | 5/2009 | | |
| EP | 2444723 | | 4/2012 | | |
| FR | 2966402 | * | 4/2012 | ............ | B60Q 1/076 |
| JP | 2010202077 | | 9/2010 | | |

OTHER PUBLICATIONS

English Translation of French 2966402 published Apr. 27, 2012.*

* cited by examiner

*Primary Examiner* — Peggy Neils
(74) *Attorney, Agent, or Firm* — Jacox, Meckstroth & Jenkins

(57) ABSTRACT

A headlamp assembly comprising a light source and a housing for the light source, a dampening element for dampening movement of the housing in or generally along at least one axis in response to dynamic loads during operation of the vehicle, while permitting movement of the housing in a predetermined direction. Another embodiment comprises a headlamp assembly comprising a light source and a support housing having a projection extending from the support housing. At least one isolator is mounted on the projection and a bracket comprising a working surface generally opposes a landing surface of a landing. The working surface comprises a slot adapted to receive a post and permit the post to move in the slot. The at least one isolator cooperates and engages the working surface or the landing surface to dampen movement of the support housing in response to dynamic loads during operation of the vehicle.

36 Claims, 9 Drawing Sheets

HEADLIGHT DAMPENING SYSTEM AND METHOD

BACKGROUND OF THE INVENTION

1. Field of the Invention

The invention relates to headlamps and, more particularly, to a headlamp system and method comprising a headlamp support having a dampener or dampening element that reduces unwanted motion of the headlamp support in at least one or a plurality of axes or directions.

2. Description of the Related Art

Headlight assemblies are becoming increasingly sophisticated with light sources, light guides, optics, lenses, cameras and the like being contained in one assembly. It is not uncommon that a lamp-support housing or support frame was used to support, for example, the lamps or light sources in the headlamp assembly. Unfortunately, the increased complexity and components has increased the overall mass of some headlamp assemblies and lamp support housing, sometimes in excess of 2 kilograms.

During normal vehicle operation it is not uncommon that dynamic loads cause stresses on the headlamp assembly and lamp support housing, such as when the vehicle hits a pothole or bump in the road. These stresses can cause considerable loads and vibration to occur to the lamp housing and can cause failures in the lamp housing at the various points where the housing is fixed to the vehicle. The increased mass in turn has caused failures in the components within the headlamp assembly, such as in brackets or fasteners used to support the light source housing on the headlamp assembly.

Another related problem is that the light sources and/or housing that supports the light sources typically must be adjusted, moved, tilted or rotated in a plane or along an axis that is in or generally parallel to an X-axis of the headlamp support housing. Consequently, it is not desirable to simply modify the lamp support housing to include, for example, more static or unadjustable points of fixation because that would interfere with the ability to adjust a position of the lamp support.

What is needed, therefore, is a system and method that overcomes one or more of the problems mentioned.

SUMMARY OF THE INVENTION

It is, therefore, one object of one embodiment of the invention to provide a system and method that overcomes one or more of the problems of the past.

Another object of another embodiment of the invention is to provide a dampening system that reduces stress on the components of the headlamp assembly, such as the lamp housing.

Still another object of another embodiment of the invention is to provide a dampening system and method that is adapted to reduce stress during dynamic loads while permitting the lamp housing to be capable of moving along or generally parallel to a desired axis, such as an X-axis of the lamp housing.

Yet another object of another embodiment of the invention is to provide a housing support and dampener adapted to dampen undesired movement or vibration of the housing in the directions of both a Y-axis and a Z-axis of the housing.

Another object of an embodiment of the invention is to reduce headlamp motion in a plurality of directions, such as along or parallel to the Y-axis and the Z-axis, while allowing translation along or parallel to another axis, such as the X-axis.

In one aspect, one embodiment of the invention comprises a headlamp assembly for a vehicle, the headlamp assembly comprising at least one light source, a housing for supporting the at least one light source, a dampening element for dampening movement of the housing generally along or parallel to at least one axis of the housing in response to dynamic loads during operation of the vehicle, while permitting movement of the housing in a predetermined direction along or parallel to an axis of movement of the housing.

In another aspect, another embodiment of the invention comprises a dampening assembly that comprises a post and cooperating bracket having a U-shaped relief, slot or receiving area that is adapted to receive the post so that at least one or a plurality of isolators mounted on the post become situated in operative relationship with a plurality of walls of the bracket and a landing surface of a landing to enable dampening of unwanted motion of the housing in multiple axes, while permitting motion in at least one other axis.

In still another aspect, another embodiment of the invention comprises a headlamp assembly for a vehicle, the headlamp assembly comprises a primary housing, at least one light source, a support housing for supporting the at least one light source in the primary housing, the support housing having at least one projection or post extending from the support housing, at least one isolator mounted on the at least one projection or post, and a first dampener comprising a bracket, the first dampener comprising a plurality of walls that cooperate with a landing surface to an area for receiving the at least one isolator, at least one of the plurality of walls having a working surface that generally opposes the landing surface of a landing, the working surface of the bracket comprising a slot or relief adapted and dimensioned to receive the at least one projection or post and permit the at least one projection or post to move in the slot or relief, the at least one isolator cooperating and engaging at least one of the plurality of walls or the landing surface to dampen movement of the support housing in response to dynamic loads during operation of the vehicle.

These and other objects and advantages of the invention will be apparent from the following description, the accompanying drawings and the appended claims.

DETAILED DESCRIPTION OF THE PREFERRED EMBODIMENTS

Referring now to FIGS. 1-8, a primary headlamp assembly 10 for mounting on a vehicle (not shown) is shown in assembled form comprising a primary headlamp assembly housing 12 and an outer lens 14. While the illustration shows features of the invention used with a left-hand headlamp assembly for use as a left-hand headlamp, it is to be understood that the right-hand headlamp is a symmetrical mirror image and comprises the same or similar features. For ease of understanding the features and various axes of dampening or movement being described, the conventional Cartesian coordinates, illustrated in FIGS. 3A and 4A, are used to illustrate the X-axis, Y-axis and Z-axis.

Figure 1:
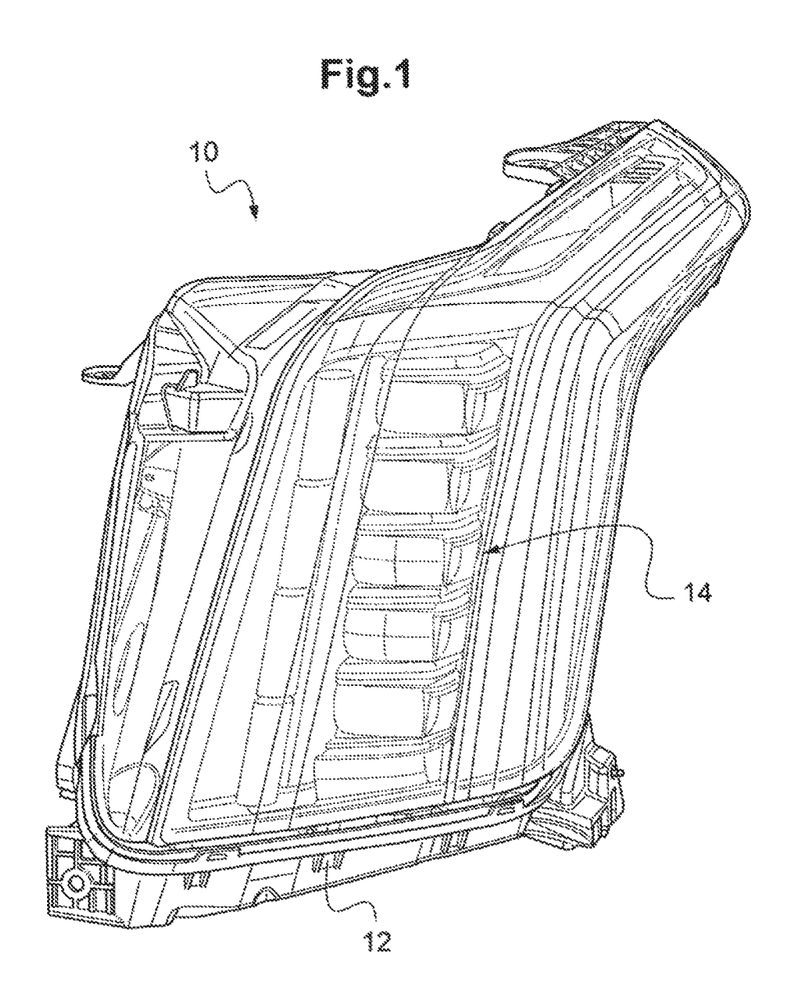
FIG. 1 is a view of a headlight assembly in accordance with one embodiment of the invention.
Figure 2A:
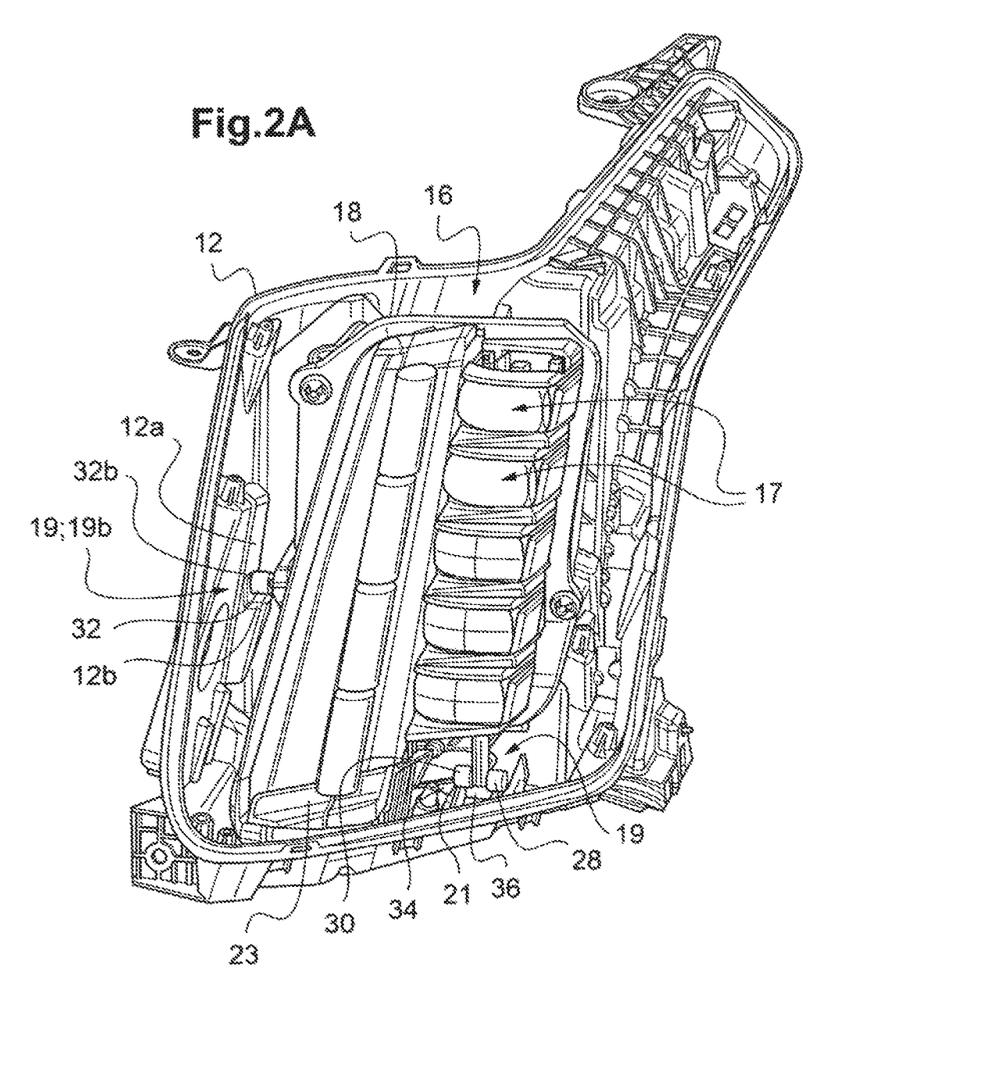
FIG. 2A is a view of the headlight assembly of FIG. 1 with the lens removed therefrom.

In the illustration being described, the primary headlamp assembly 10 comprises a support housing 18 (FIG. 2A) for receiving and supporting an optical system 16 of the primary headlamp assembly 10. In the illustration being described, the optical system 16 may comprise at least one or a plurality of light sources 17 and other optical components (e.g., lenses, a camera, light guides and the like). The headlight assembly 10 also includes a bezel 23 that is shown in FIG. 2A, but removed in FIG. 2B to illustrate features of the support housing 18.

One important advantage or feature of the embodiments being described is that they comprise a dampener, dampening element or dampening system 19 that permits translational movement generally along or parallel to an X-axis which enables the support housing 18 to rotate, move or pivot generally along or parallel to the X-axis, while restricting and dampening movement generally along or parallel to both the Y-axis and the Z-axis of the support housing 18. Features of the dampener, dampening element or dampening system 19 will now be described.

Referring now to FIGS. 2A-6, the dampener, dampening element or dampening system 19 comprises a first dampener 19a (FIGS. 4A-6). The first dampener 19a comprises at least one projection or post 20 that extends generally vertically downward (as viewed in FIGS. 2A-3B). The projection or post 20 is generally elongated in the illustration and comprises a first end 20a integrally formed in the support housing 18, a second end 20b and an intermediate portion 20c, as shown in FIGS. 3A-3B and 4A-4D. Note that the projection or post 20 has an axis PA (FIG. 3B) generally along or parallel to the Z-axis of the support housing 18 as shown. The projection or post 20 comprises a second end 20b having at least one or a plurality of isolator supports 22 and 24 integrally formed in proximity to the second end 20b, as illustrated in FIG. 3B. The projection or post 20 and the support housing 18 may comprise reinforcement structure or ribbing 18a (FIG. 3B) for reinforcing the projection or post 20.

The support housing 18 may further comprise a second dampener 19b (FIGS. 2A-2B) having at least one or a plurality of other isolator supports, such as the lateral isolator support 26 (FIGS. 3A and 3B) having at least one isolator 32, which projects generally laterally along or parallel to the Y-axis of the support housing 18. In the illustration being described, the plurality of isolators 28, 30 and 32 are generally cylindrical or tubular in cross-section and are adapted to permit some movement of the projection or post 20 and the support housing 18 as described herein. In one embodiment, each of the plurality of isolators 28, 30 and 32 have the following dimensions: a diameter of about 5 mm, height of about 15 mm and a width of about 11 mm. It should be understood, however, that they could comprise different sizes and shapes as may be desired.

Referring now to FIGS. 4A-4D, notice that the isolator supports 22, 24 and 26 provide or define lugs or axles that receive the isolators 28, 30 and 32, respectively. In the illustration being described, the isolator supports 22, 24 and 26 each receive and support at least one isolator 28, 30 and 32, respectively. The isolators 28, 30 and 32 are compressible polymer or rubber, but they could be made of other materials.

Figure 7:
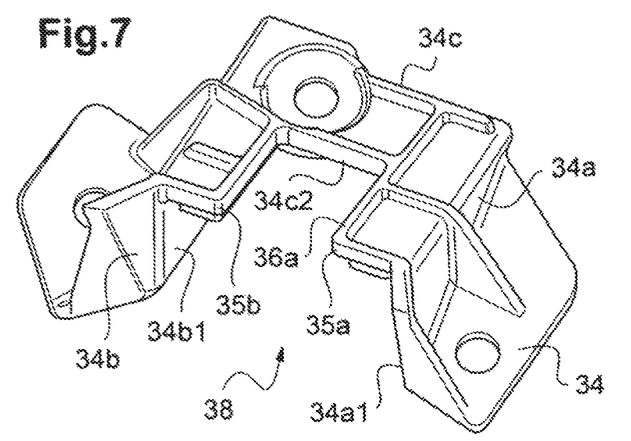
FIG. 7 is an isometric view of a bracket used with the first dampener.
Figure 8:
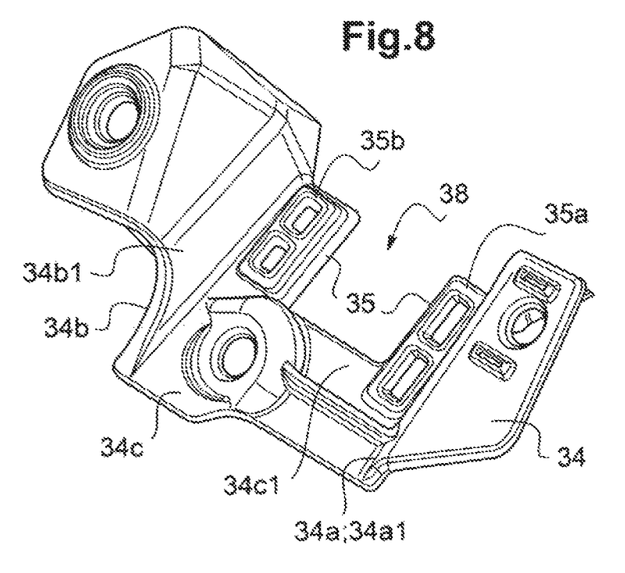
FIG. 8 is bottom view of the bracket shown in FIG. 7.

The first dampener 19a of the dampener, dampening element or dampening system 19 further comprises a dampening retainer or bracket 34 (FIGS. 2A-2B and 4A-4D) and a landing 36. It should be understood that the dampening retainer or bracket 34 is conventionally mounted to the primary headlamp assembly housing 12 using conventional fasteners which secure the dampening retainer or bracket 34 to the mounting bosses or sockets 21 (FIGS. 2A-2B) that are integral with the primary headlamp assembly housing 12. The bosses or sockets 21 and landing 36 are integrally formed in the primary headlamp assembly housing 12. The dampening retainer or bracket 34 is generally U-shaped and comprises a first wall portion 34a that generally opposes a second wall portion 34b and that is joined by a working wall portion 34c that defines a working surface 34c1, as best illustrated in FIGS. 7 and 8. The first and second wall portions 34a and 34b comprise internal wall surfaces 34a1 and 34b1, respectively. Once the dampening retainer or bracket 34 is mounted to the primary headlamp assembly housing 12, notice that the working surface 34c1 of the dampening retainer or bracket 34 is situated a predetermined distance from a landing surface 36a of the landing 36. The working surface 34c1, landing surface 36a and the generally opposing wall surfaces 34a1 and 34b1 cooperate to define a travel area in which the projection or post 20 and isolators 28 and 30 may travel in response to relative movement between the primary headlamp assembly housing 12 and the support housing 18. As described in more detail later herein, a distance between the wall portions 34a and 34b are slightly larger than the dimension D1 (FIG. 4C) between side walls 28b and 30b of the isolators 28 and 30. Likewise, a dimension D2, which corresponds to a height of the isolators 28, 30, is slightly smaller than a distance between the working surface 34c1 and the landing surface 36a. This permits some floating movement of the at least one or plurality of isolators 28, 30.

Regarding the lateral isolator 32 of the second dampener 19b, notice that the primary headlamp assembly housing 12 comprises an integrally formed wall surface 12a and a generally perpendicular second landing surface 12b that becomes operationally associated with a side wall surface 32b and surface 32a, respectively, of isolator 32. The dampening operation and function of the dampening retainer or bracket 34 (FIG. 8), landing surfaces 12b and 36a and isolators 28, 30 and 32 will be described in more detail later herein.

Returning now to FIGS. 7 and 8, notice that the wall portion 34c (FIGS. 7 and 8) of the dampening retainer or bracket 34 comprises a generally U-shaped wall portion 34c2 that defines a U-shaped receiving area, relief or slot 38 that receives the projection or post 20, as best illustrated in FIGS. 3A and 4A-4D. The receiving area, relief or slot 38 is dimensioned to permit the projection or post 20 to move therein, for example, translationally in the direction of the X-axis of the support housing 18. This permits the support housing 18 to be adjusted within the primary headlamp assembly 10 by one or more actuators (not shown) in the primary headlamp assembly 10.

In the illustration being described, the wall portion 34c comprises a first working surface 35a (FIGS. 7 and 8) and a second working surface 35b. The first and second working surfaces 35a and 35b are generally opposed to the landing surface 36a mentioned earlier herein after the dampening retainer or bracket 34 is mounted to the primary headlamp assembly housing 12. When the support housing 18 is mounted in the primary headlamp assembly 10, the projection or post 20 is received in the area, relief or slot 38, as shown in FIGS. 3A-6. Note that the surfaces 28a and 30a of the plurality of isolators 28 and 30 become generally opposed to and operatively associated with the working surfaces 35a and 35b, respectively, of the working surface 35 and landing surface 36a of landing 36. When the position of the support housing 18 is adjusted, which in turn causes a position of the optical system 16 that is mounted in the support housing 18 to be adjusted, the at least one or a plurality of isolators 28 and 30 may move or rotate to permit the movement of the support housing 18 generally along or parallel to the X-axis, even while engaging the working surfaces 35a and 35b or the landing surface 36a.

The landing 36 is static and an integral component of the primary headlamp assembly housing 12. As mentioned earlier herein, the projection or post 20 can move in the receiving area, relief or slot 38 generally along or parallel to the X-axis of the support housing 18 and in the direction of double arrow A in FIG. 4A. Note, however, that the projection or post 20 is also adapted to move within the receiving area, relief or slot 38 in the direction of the Z-axis until the at least one or a plurality of isolators 28 and 30 engage the working surfaces 35a and 35b, respectively, in the event they move closer together (e.g., upward as viewed in FIG. 4B) in the primary headlamp assembly 10 as a result of the dynamic load caused by vehicle movement. Alternatively, the at least one or a plurality of isolators 28 and 30 may move the landing surface 36a (e.g., downward as viewed in FIG. 4B) as a result of a dynamic load caused by vehicle movement. The isolators 28 and 30 compress and absorb the shock and stress caused by the dynamic loads, thereby dampening the movement and relative stress on the components moving in the Z-axis.

Advantageously, the at least one or plurality of isolators 28 and 30 cooperate and engage the working surfaces 35a, 35b or the landing surface 36a (FIGS. 3-6) to dampen movement of the support housing 18 in the direction of the vertical Z-axis in response to relative movement between the primary headlamp assembly housing 12 and the support housing 18 caused by dynamic loads during operation of the vehicle. Thus, for example, when the vehicle encounters a pothole or bump in the road that places a dynamic load on the primary headlamp assembly 10 and components therein, the at least one or plurality of isolators 28 and 30 will engage the working surfaces 35a, 35b and/or landing surface 36a to dampen the undesired movement or vibration. This provides dampening generally along or parallel to the Z-axis.

The first dampener 19a of the dampener, dampening element or dampening system 19 also dampens movement in the direction in or generally along or parallel to the Y-axis as will now be described. Notice in FIG. 4B that the at least one isolator 28 comprises the side wall 28b that is generally opposed to the wall surface 34a1 of wall portion 34a of the dampening retainer or bracket 34. Likewise, the at least one isolator 30 comprises the side wall 30b that becomes generally opposed to the wall surface 34b1 of wall portion 34b of the dampening retainer or bracket 34. During movement of the support housing 18 in the direction along or generally parallel to the Y-axis of the support housing 18, the side walls 28b and 30b engage the wall surfaces 34a1 and 34b1, respectively, to dampen the lateral movement of the support housing 18 along or generally parallel to the Y-axis.

Advantageously, the dampener, dampening element or dampening system 19 comprising the first dampener 19a having the projection or post 20, at least one or plurality of isolators 28 and 30, dampening retainer or bracket 34 and landing surface 36a cooperate to dampen movement of the primary headlamp assembly housing 12 in at least one or a plurality of axes, such as the Z-axis and the Y-axis in the illustration being described, while permitting movement of the projection or post 20 in the receiving area, relief or slot 38 and in, along or generally parallel to the X-axis.

Figure 2B:
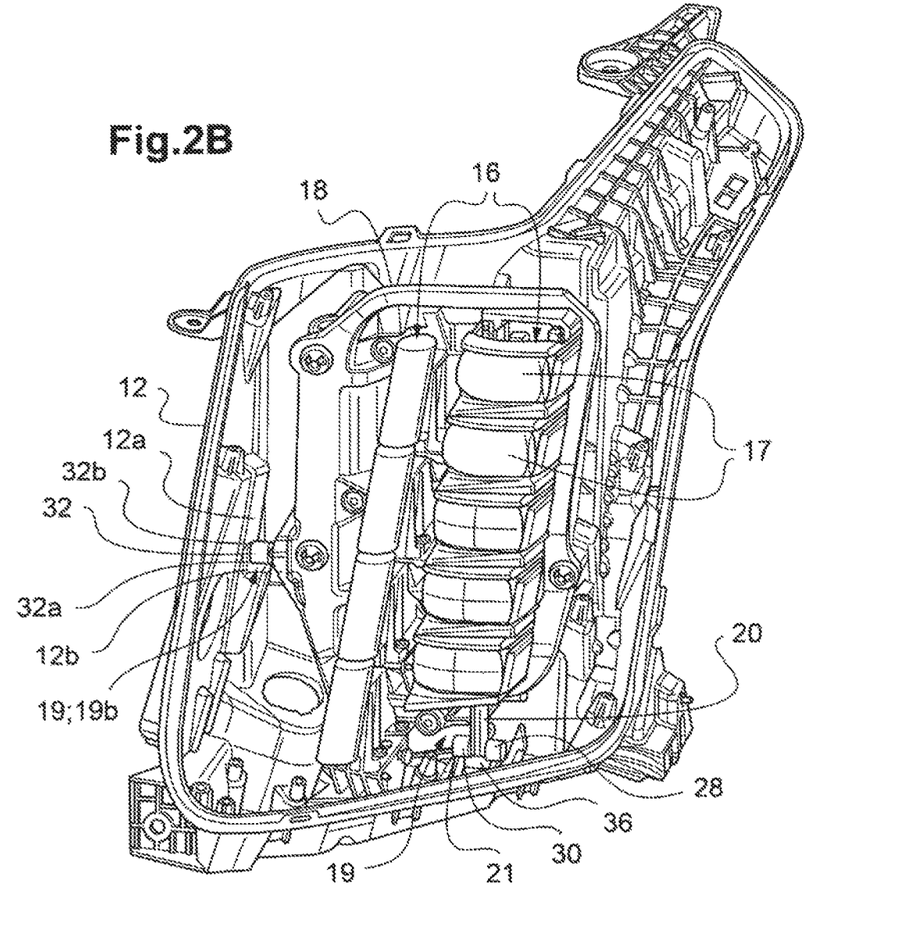
FIG. 2B is a view similar to FIG. 2A with the reflector removed therefrom.
Figure 3A:
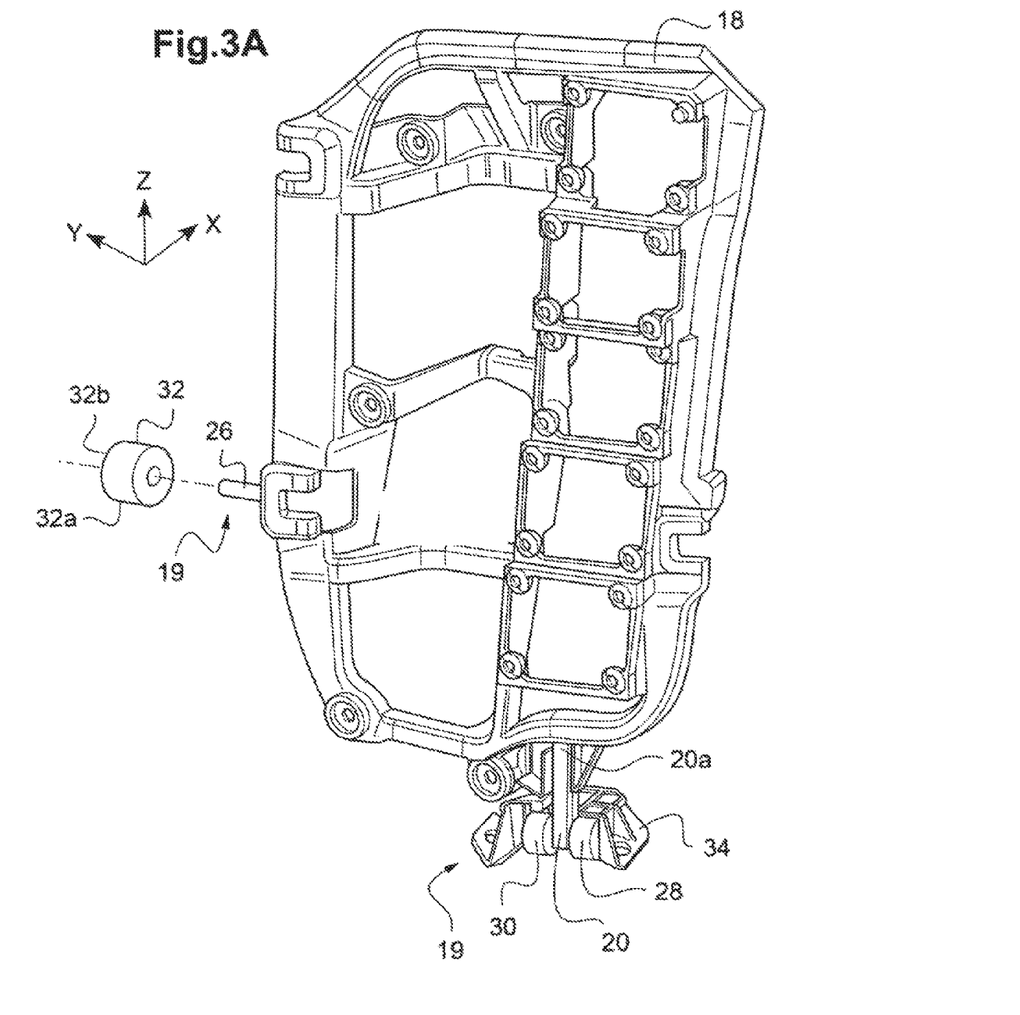
FIG. 3A is a view of a support housing showing a dampening system in accordance with one of the invention.
Figure 3B:
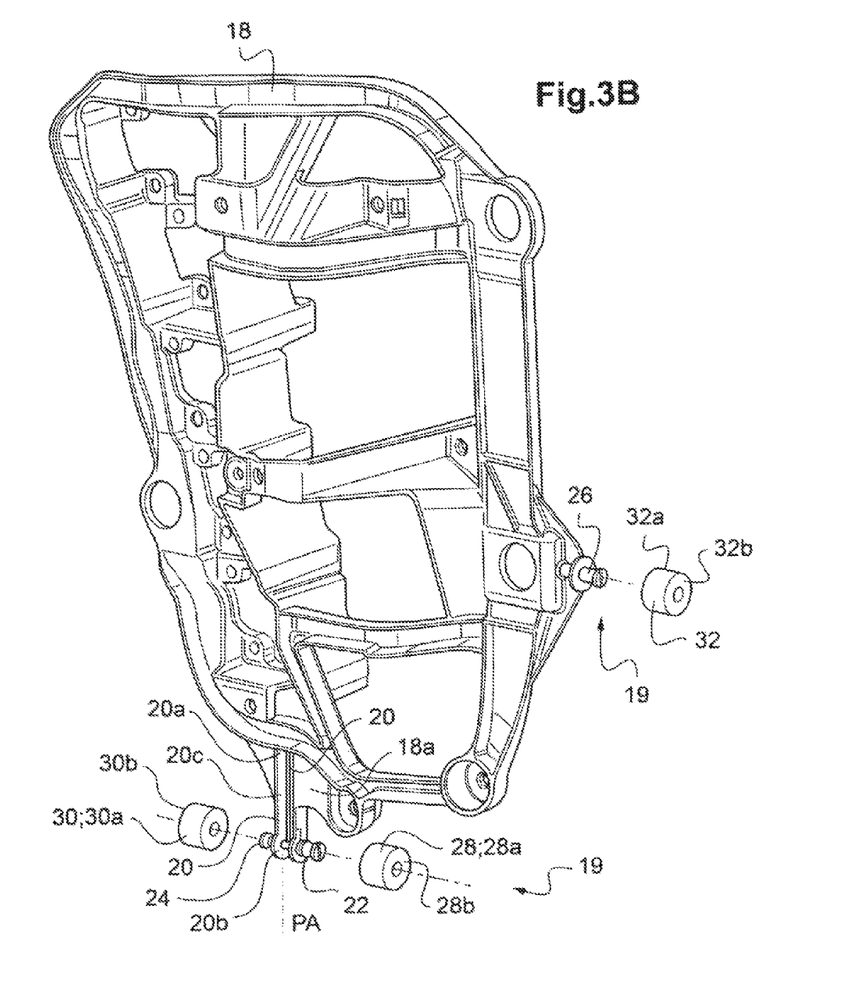
FIG. 3B is a rear view of the support housing shown in FIG. 3A.
Figure 4A:
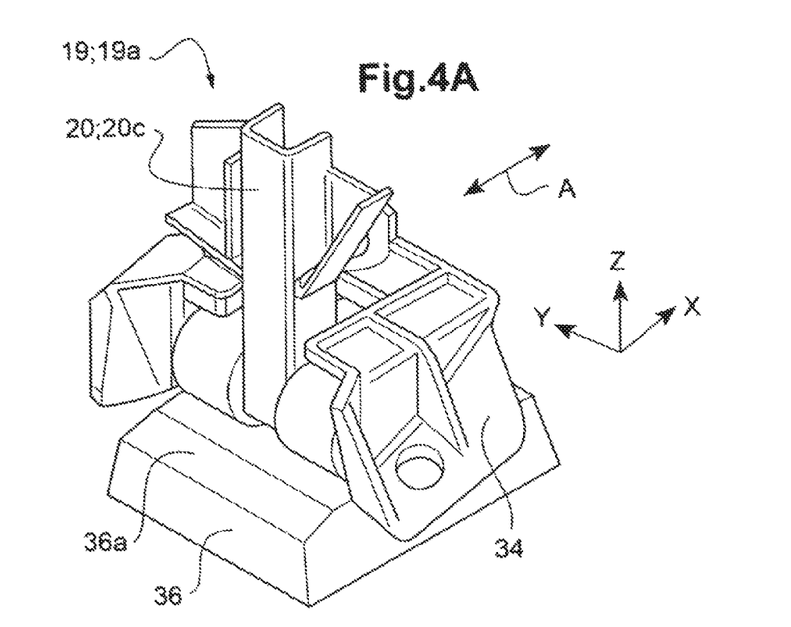
FIG. 4A is a perspective view of a first dampener in accordance with one embodiment of the invention.
Figure 4B:
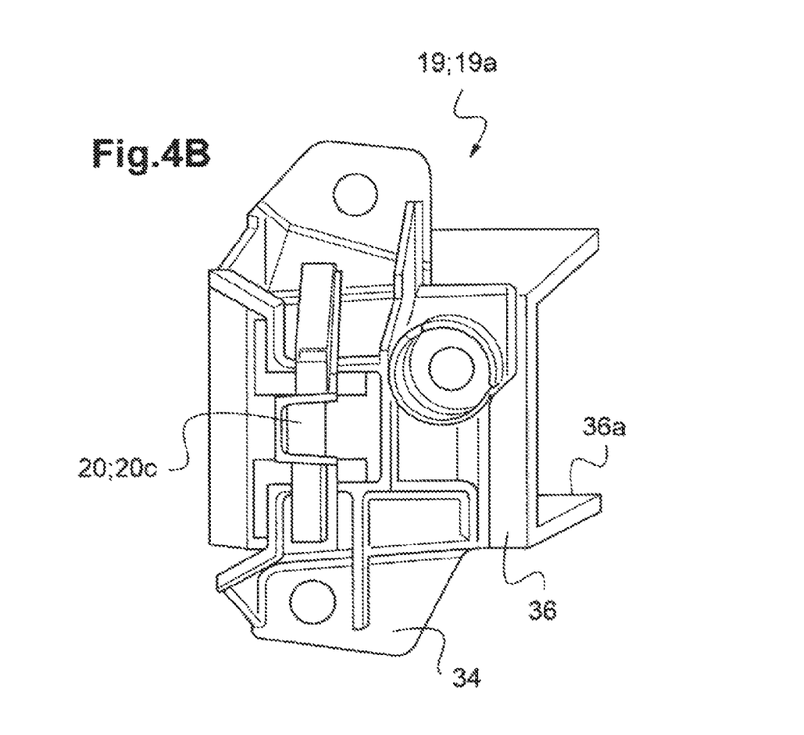
FIG. 4B is a sectional top view of the first dampener shown in FIG. 4A.
Figure 4C:
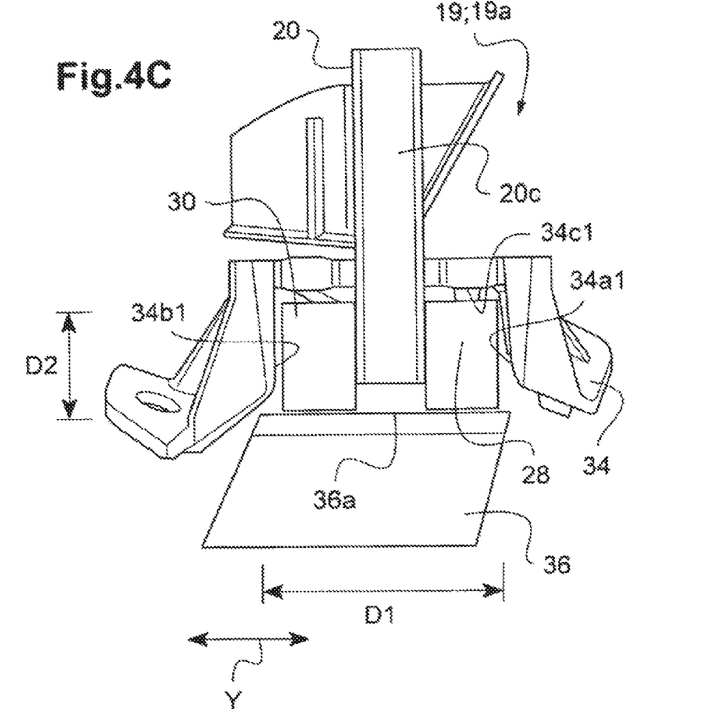
FIG. 4C is a front view of the first dampener shown in FIG. 4A.
Figure 4D:
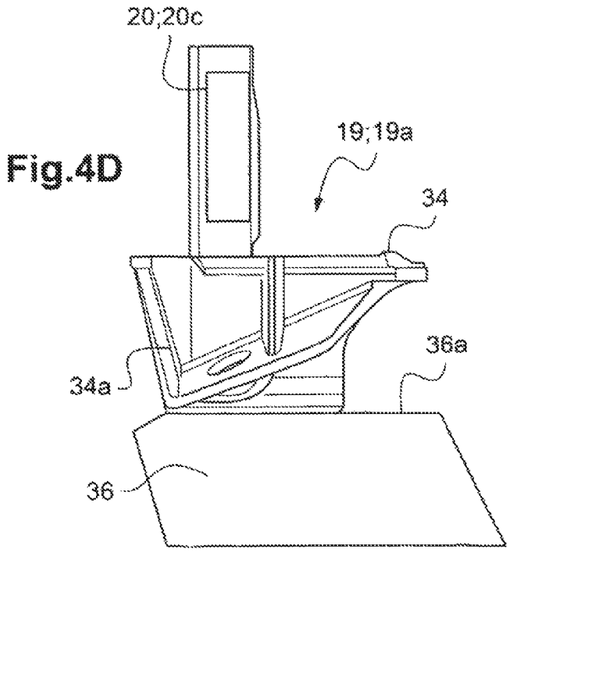
FIG. 4D is a side view of the first dampener shown in FIG. 4A.
Figure 5:
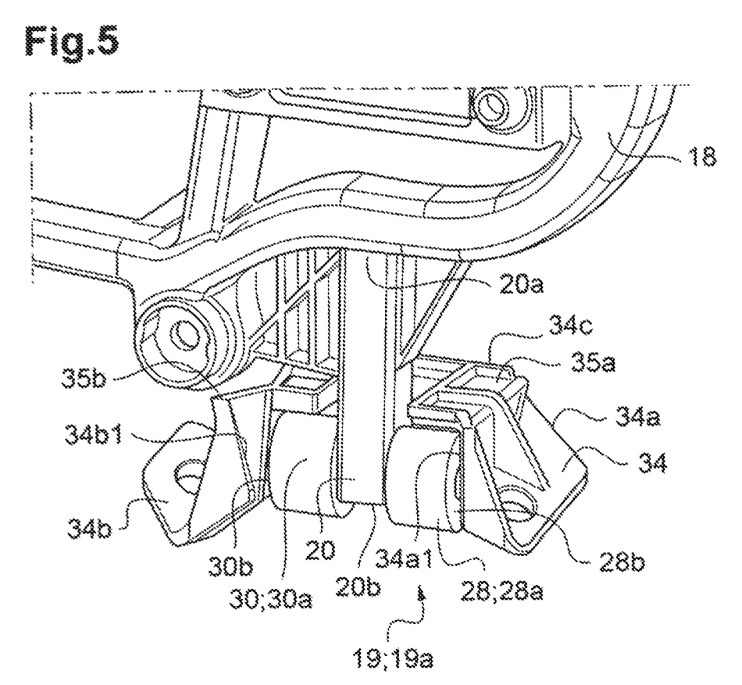
FIGS. 5 and 6 are enlarged sectional views showing details of the first dampener.
Figure 6:
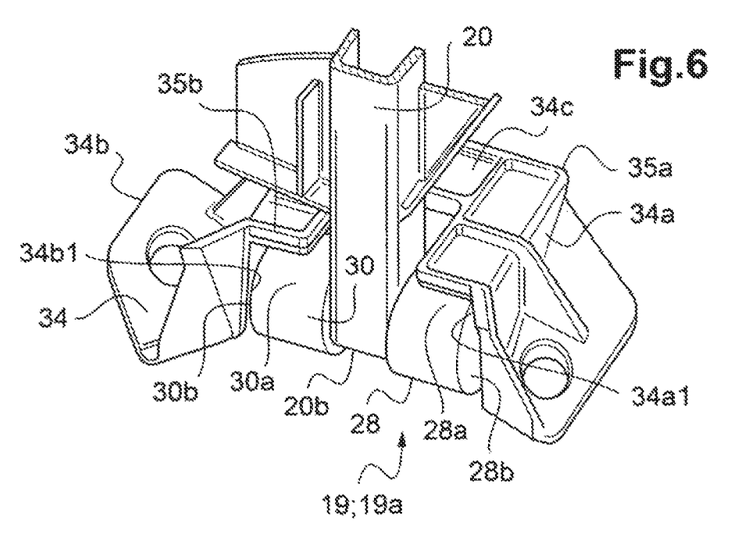

In the illustration being described, the dampener, dampening element or dampening system 19 comprises the second dampener 19b having the isolator support 26 which supports the isolator 32 having the surface 32a and side wall surface 32b, as best illustrated in FIGS. 2A and 2B. Notice that the isolator support 26 projects generally in the Y-direction or generally or parallel to the Y-axis and generally perpendicular to the Z-axis. Note that the side wall surface 32b of the isolator 32 becomes generally opposed to and in operative relationship with the wall surface 12a of the primary headlamp assembly housing 12. When the support housing 18 and the wall surface 12a move toward each other, the side wall surface 32b of isolator 32 engages the wall surface 12a to dampen movement of the support housing 18 along or generally parallel to the Y-axis.

Note also that the surface 32a of the isolator 32 is operatively associated with the second landing surface 12b to permit translational movement in, along or parallel to the X-axis while restraining movement in the vertical direction downwardly (as viewed in FIGS. 2B-2C) along or generally parallel to the Z-axis.

Accordingly, the second dampener 19b comprising the isolator 32 cooperates with the wall surface 12a and landing surface 12b to provide further dampening of undesired movement or motion of the support housing 18 in the primary headlamp assembly 10, while permitting movement in, along or parallel to the X-axis.

While the projection or post 20, and lugs or isolator supports 22, 24 and 26 have been shown oriented as viewed in the Figures, it should be appreciated that they could be oriented in other configurations to achieve the desired dampening. For example, the projection or post 20 may be provided on the primary headlamp assembly housing 12 and the dampening retainer or bracket 34 mounted on or integrally formed in the support housing 18.

Advantageously, the dampener, dampening element or dampening system 19 provides means and apparatus for dampening unwanted vibration or movement along or generally parallel to the Y-axis and Z-axis, while permitting movement of the support housing 18 in the X-axis. In this regard, the plurality of isolators 28, 30 and 32 are rotatably mounted on the isolator supports 22, 24 and 26 so that they may rotate when moving along or generally parallel to the X-axis while they simultaneously engage their respective working surface 35a, landing surface 36a and/or landing surface 12b.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A headlamp assembly for a vehicle, said headlamp assembly comprising:
   at least one light source;
   a housing for supporting said at least one light source, said housing having at least one housing axis of movement;
   a dampening element for dampening movement of said housing generally along or parallel to said at least one housing axis of movement in response to dynamic loads during operation of the vehicle, while permitting movement of said housing in a predetermined direction along or parallel to said at least one housing axis of movement;
   wherein said assembly further comprises a working surface that cooperates with a landing surface to define a travel area that receives said dampening element and permits said dampening element to move between said landing surface and said working surface, said landing surface and said working surface cooperating to limit travel of said dampening element to dampen movement of said housing in a predetermined direction;
   wherein said dampening element does not lie in said at least one housing axis of movement and is adapted to move along said landing surface in said travel area to permit said housing to be moved or pivoted in a second predetermined direction.

2. The headlamp assembly of claim 1 wherein said predetermined direction is along or generally parallel to a Z-axis of said housing.

3. The headlamp assembly of claim 1 wherein said predetermined direction is along or parallel to both a Y-axis and a Z-axis of said housing.

4. The headlamp assembly of claim 1 wherein said predetermined direction is generally parallel to an X-axis of said housing and said movement is a swiveling, linear, arcuate or rotational movement of said housing generally along or generally parallel to said X-axis of said housing.

5. The headlamp assembly as recited in claim 1 wherein said dampening element comprises a first dampener for dampening movement generally along or parallel to a Y-axis and a Z-axis of said housing.

6. The headlamp assembly as recited in claim 5 wherein said first dampener comprises:
   a projection or post extending from said housing, said projection or post comprising at least one isolator;
   a bracket that provides said working surface;
   a landing providing said landing surface;
   said at least one isolator being received between said bracket and said landing surface to dampen movement of said housing along or generally parallel to said at least one housing axis of movement in response to said dynamic loads during operation of the vehicle.

7. The headlamp assembly of claim 6 wherein said at least one isolator is compressible.

8. The headlamp assembly of claim 7 wherein said at least one isolator is generally cylindrical or tubular.

9. A headlamp assembly for a vehicle, said headlamp assembly comprising:
   at least one light source;
   a housing for supporting said at least one light source;
   a dampening element for dampening movement of said housing generally along or parallel to at least one axis of said housing in response to dynamic loads during operation of the vehicle, while permitting movement of said housing in a predetermined direction along or parallel to an axis of movement of said housing;
   wherein said dampening element comprises a first dampener for dampening movement generally along or parallel to both a Y-axis and a Z-Axis;
   wherein said first dampener comprises:
   a projection or post extending from said housing, said projection or post comprising at least one isolator;
   a bracket;
   a landing having a landing surface;
   said at least one isolator being received between said bracket and said landing surface to dampen movement of said housing along or generally parallel to said axis of movement in response to said dynamic loads during operation of the vehicle;
   wherein said bracket comprises a generally U-shaped wall defining a generally U-shaped receiving area, relief or slot for receiving said projection or post and for permitting said projection or post to move along an X-axis of said housing, thereby permitting adjustment of a position of said housing along or generally parallel to said X-axis.

10. The headlamp assembly of claim 6 wherein said bracket comprises a working surface that cooperates with said landing surface that generally opposes said working surface to define an area of travel, said working surface of said bracket comprising a receiving area, slot or relief in communication with said area of travel and adapted to receive said projection or post and permit said projection or post to move in said receiving area, slot or relief so that said housing can move in said predetermined direction, said at least one isolator being situated in said area of travel and cooperating with said working surface and said generally opposing landing surface to dampen or restrict movement of said housing along a Z-axis of said housing.

11. A headlamp assembly for a vehicle, said headlamp assembly comprising:
    at least one light source;
    a housing for supporting said at least one light source;
    a dampening element for dampening movement of said housing generally along or parallel to at least one axis of said housing in response to dynamic loads during operation of the vehicle, while permitting movement of said housing in a predetermined direction along or parallel to an axis of movement of said housing;
    wherein said dampening element comprises a first dampener for dampening movement generally along or parallel to both a Y-axis and a Z-Axis;
    wherein said first dampener comprises:
    a projection or post extending from said housing, said projection or post comprising at least one isolator;
    a bracket;
    a landing having a landing surface;
    said at least one isolator being received between said bracket and said landing surface to dampen movement of said housing along or generally parallel to said axis of movement in response to said dynamic loads during operation of the vehicle;
    wherein said bracket comprises a working surface that cooperates with said landing surface that generally opposes said working surface to define an area of travel, said working surface of said bracket comprising a receiving area, slot or relief in communication with said area of travel and adapted to receive said projection or post and permit said projection or post to move in said receiving area, slot or relief so that said housing can move in said predetermined direction, said at least one isolator being situated in said area of travel and cooperating with said working surface and said generally opposing landing surface to dampen or restrict movement of said housing along a Z-axis of said housing;

wherein said bracket comprises a first wall portion, a second wall portion and a third wall portion that joins said first and second wall portions, a plurality of isolators comprising side walls that cooperate with and engage said first and second side wall portions to dampen movement generally along or parallel to a Y-axis of said housing.

12. A headlamp assembly for a vehicle, said headlamp assembly comprising:
   at least one light source;
   a housing for supporting said at least one light source;
   a dampening element for dampening movement of said housing generally along or parallel to at least one axis of said housing in response to dynamic loads during operation of the vehicle, while permitting movement of said housing in a predetermined direction along or parallel to an axis of movement of said housing;
   wherein said dampening element comprises a first dampener for dampening movement generally along or parallel to both a Y-axis and a Z-Axis;
   wherein said first dampener comprises:
   a projection or post extending from said housing, said projection or post comprising at least one isolator;
   a bracket;
   a landing having a landing surface;
   said at least one isolator being received between said bracket and said landing surface to dampen movement of said housing along or generally parallel to said axis of movement in response to said dynamic loads during operation of the vehicle;
      wherein said bracket is generally U-shaped and comprises a first wall portion, a second wall portion and a third wall portion joining said first and second wall portions;
      said first and second wall portions cooperating with said at least one isolator to dampen lateral movement generally along or parallel to a Y-axis of said housing and said third wall portion comprising a working surface that generally opposes said landing surface, said working surface of said landing surface cooperating to dampen vertical movement along a Z-axis of said housing.

13. The headlamp assembly as recited in claim 12 wherein said projection or post is generally elongated and has an intermediate portion extending through said generally U-shaped receiving area, relief or slot, and further comprising a plurality of lugs or axles adapted to receive a plurality of isolators, respectively, and support said plurality of isolators in a travel area defined by said first wall portion, said second wall portion, said third wall portion and said landing surface.

14. A headlamp assembly for a vehicle, said headlamp assembly comprising:
   at least one light source;
   a housing for supporting said at least one light source;
   a dampening element for dampening movement of said housing generally along or parallel to at least one axis of said housing in response to dynamic loads during operation of the vehicle, while permitting movement of said housing in a predetermined direction along or parallel to an axis of movement of said housing;
   wherein said dampening element comprises a first dampener for dampening movement generally along or parallel to both a Y-axis and a Z-Axis;
   wherein said first dampener comprises:
   a projection or post extending from said housing, said projection or post comprising at least one isolator;
   a bracket;
   a landing having a landing surface;
   said at least one isolator being received between said bracket and said landing surface to dampen movement of said housing along or generally parallel to said axis of movement in response to said dynamic loads during operation of the vehicle;
      wherein said dampening element further comprises a second dampener, said second dampener comprising:
      a lateral isolator support that projects generally laterally from said housing and has at least one lateral isolator thereon, said at least one lateral isolator cooperating with a primary housing first wall and a primary housing landing surface to dampen movement along or generally parallel to said Y-axis and said Z-axis, while permitting movement of said housing generally along or parallel to an X-axis of said housing.

15. The headlamp assembly of claim 14 wherein said lateral isolator support comprises a lateral projection integral with said housing and supporting at least one lateral isolator, said lateral projection extending generally laterally along or parallel to a Y-axis of said housing, at least one surface of said primary housing to dampen movement of said housing, said at least one isolator comprising a compressible material.

16. The headlamp assembly of claim 15 wherein said primary housing comprises a side wall and a primary housing landing surface that is generally perpendicular to said side wall, said at least one isolator cooperating with said primary housing landing surface and said side wall to dampen movement of said housing in a direction generally along or parallel to both a Y-axis and a Z-axis while permitting movement generally along or parallel to an X-axis.

17. A headlamp assembly for a vehicle, said headlamp assembly comprising:
   at least one light source;
   a housing for supporting said at least one light source;
   a dampening element for dampening movement of said housing generally along or parallel to at least one axis of said housing in response to dynamic loads during operation of the vehicle, while permitting movement of said housing in a predetermined direction along or parallel to an axis of movement of said housing;
   wherein said dampener further comprises a second dampener, said second dampener comprising:
   a lateral isolator support projection from said housing and having at least one isolator thereon, said lateral isolator support cooperating with a primary housing first wall and a primary housing landing surface to dampen movement generally along said Y-axis and said Z-axis, while permitting movement of said housing generally along or parallel to an X-axis of said housing.

18. The headlamp assembly of claim 6 wherein said projection or post has a first end integrally formed in said housing and an isolator support proximate a second end of said post for supporting said at least one isolator.

19. The headlamp assembly of claim 18 wherein said dampening element comprises a plurality of isolators, said isolator support comprises a plurality of isolator supports adapted to receive and support said plurality of isolators, respectively.

20. The headlamp assembly of claim 19 wherein said plurality of isolator supports comprise a plurality of lugs, respectively, integrally formed proximate to said second end of said post, said plurality of lugs receiving and supporting said plurality of isolators, respectively, in operative relationship with said bracket after said plurality of isolators are received in said bracket.

21. The headlamp assembly of claim 20 wherein said plurality of lugs comprise axes that are generally coaxial and generally perpendicular to an axis of said projection or post.

22. The headlamp assembly of claim 19 wherein said plurality of isolators are each compressible.

23. The headlamp assembly of claim 19 wherein each of said plurality of isolators is generally cylindrical or tubular and adapted to be mounted on said plurality of lugs.

24. The headlamp assembly of claim 6 wherein said post comprises an axis that is generally parallel to a Z-axis of said housing.

25. A headlamp assembly for a vehicle, said headlamp assembly comprises:
a primary housing;
at least one light source;
a support housing for supporting said at least one light source in said primary housing, said support housing having at least one projection or post extending from said support housing;
at least one isolator mounted on said at least one projection or post; and
a first dampener comprising a bracket, said first dampener comprising a plurality of walls that cooperate with a landing surface to an area for receiving said at least one isolator, at least one of said plurality of walls having a working surface that generally opposes said landing surface of a landing, said working surface of said bracket comprising a slot or relief adapted and dimensioned to receive said at least one projection or post and permit said at least one projection or post to move in said slot or relief;
said at least one isolator cooperating and engaging at least one of said plurality of walls or said landing surface to dampen movement of said support housing in response to dynamic loads during operation of the vehicle.

26. The headlamp assembly of claim 25 wherein said at least one projection or post comprises a first end integrally formed in said support housing and an isolator support proximate to a second end of said at least one projection or post, said isolator support being adapted to support said at least one isolator in operative relationship between said working surface and said landing surface.

27. The headlamp assembly as recited in claim 25 wherein said bracket comprises a generally U-shaped wall defining a generally U-shaped receiving area, relief or slot for receiving said projection or post and for permitting said projection or post to move along an X-axis, thereby permitting adjustment of a position of said housing along said X-axis.

28. The headlamp assembly as recited in claim 25 wherein said bracket is generally U-shaped and comprises a first wall portion, a second wall portion and a third wall portion joining said first and second wall portions;
said first and second wall portions cooperating with said at least one isolator to dampen lateral movement generally along or parallel to a Y-axis of said housing and said third wall portion and said landing surface cooperating to dampen vertical movement along a Z-axis of said housing.

29. The headlamp assembly as recited in claim 28 wherein said projection or post is generally elongated and has an intermediate portion extending through said generally U-shaped receiving area, relief or slot, and further comprising a plurality of lugs or axles adapted to receive a plurality of isolators, respectively, and support said plurality of isolators in a travel area defined by said first wall portion, said second wall portion, said third wall portion and said landing surface.

30. The headlamp assembly as recited in claim 25 wherein said headlamp assembly further comprises a second dampener, said second dampener comprising:
a lateral isolator support that projects generally laterally from said housing and has at least one isolator thereon, said lateral isolator support cooperating with a primary housing first wall and a primary housing landing surface to dampen movement generally along or parallel to said Y-axis and said Z-axis, while permitting movement of said housing generally along or parallel to said X-axis of said housing.

31. The headlamp assembly as recited in claim 28 wherein said headlamp assembly further comprises a second dampener, said second dampener comprising:
a lateral isolator support projection from said housing and having at least one isolator thereon, said lateral isolator support cooperating with a primary housing first wall and a primary housing landing surface to dampen movement generally along said Y-axis and said Z-axis, while permitting movement of said housing generally along or parallel to an X-axis of said housing.

32. The headlamp assembly of claim 25 wherein said at least one isolator is compressible.

33. The headlamp assembly of claim 29 wherein said at least one projection or post is generally elongated and said isolator support comprises a plurality of lugs integrally formed proximate to said second end of said projection or post, said plurality of lugs receiving and supporting said plurality of isolators, respectively, in operative relationship with said working surface of said bracket after said plurality of isolators are received in a travel area between said bracket and said landing surface.

34. The headlamp assembly of claim 33 wherein said plurality of isolators are compressible.

35. The headlamp assembly of claim 33 wherein said plurality of isolators are generally cylindrical or tubular and adapted to be mounted on said plurality of lugs.

36. The headlamp assembly of claim 26 wherein said projection or post projects generally vertically and downwardly from said support housing along or generally parallel to a Z-axis of said support housing after the headlamp assembly is mounted on the vehicle.

* * * * *